US007210134B1

(12) United States Patent
Langer

(10) Patent No.: US 7,210,134 B1
(45) Date of Patent: Apr. 24, 2007

(54) DETERRING REVERSE-ENGINEERING OF SOFTWARE SYSTEMS BY RANDOMIZING THE SITING OF STACK-BASED DATA

(75) Inventor: Randy Langer, Port Orchard, WA (US)

(73) Assignee: Sonic Solutions, Novato, CA (US)

( * ) Notice: Subject to any disclaimer, the term of this patent is extended or adjusted under 35 U.S.C. 154(b) by 517 days.

(21) Appl. No.: 10/237,515

(22) Filed: Sep. 6, 2002

Related U.S. Application Data

(60) Provisional application No. 60/317,753, filed on Sep. 6, 2001.

(51) Int. Cl.
*G06F 9/45* (2006.01)
*G06F 9/44* (2006.01)

(52) U.S. Cl. .................. 717/140; 717/127; 713/193; 713/194; 712/202; 712/300

(58) Field of Classification Search ................ 717/127, 717/140; 713/193–194; 712/202, 300
See application file for complete search history.

(56) References Cited

U.S. PATENT DOCUMENTS

| 4,218,582 A |   | 8/1980  | Hellman et al.       |
|-------------|---|---------|----------------------|
| 4,309,569 A |   | 1/1982  | Merkle               |
| 5,123,045 A | * | 6/1992  | Ostrovsky et al. ........ 713/190 |
| 5,321,828 A | * | 6/1994  | Phillips et al. ............. 703/28 |
| 5,335,332 A | * | 8/1994  | Christopher et al. ......... 700/90 |
| 5,373,561 A |   | 12/1994 | Haber et al.         |
| 5,689,565 A |   | 11/1997 | Spies et al.         |
| 5,699,428 A |   | 12/1997 | McDonnal et al.      |
| 5,835,595 A |   | 11/1998 | Fraser et al.        |

(Continued)

OTHER PUBLICATIONS

Mambo et al. "A Tentative Approach to Constructing Tamper Resistant Software" 1997, New Security Paradigms Workshop, ACM, p. 23-33.*

(Continued)

*Primary Examiner*—Meng-Al T. An
*Assistant Examiner*—Jason Mitchell
(74) *Attorney, Agent, or Firm*—Fitch, Even, Tabin & Flannery

(57) ABSTRACT

A given software process is composed on one or more threads of execution. Each thread possesses its own stack, a region of memory set aside by the operating system for that thread to store data. Popular programming languages rely heavily on stack-based data (frequently referred to as "local" or "automatic" data). It is a characteristic of deterministic machines like computers that, given the same problem to process with the same data, the same results, both intermediate and final, will result. This even extends to the sequence the software running on the computer will take to process the problem or data. This in turn means that for each thread making up the program, the data layout in the thread's stack will be relatively consistent each time the program gets to a similar point in the processing of the problem and/or data. This represents a potential "point of repeatability" that a hacker can take advantage of. Embodiments of the current invention address this by introducing random amounts of "padding" into a thread's stack, such that all data objects that exist "below" that point in the stack are offset by the amount of this random padding. A thread could have several points in its stack where the padding is introduced, resulting in better (more difficult to hack) randomization.

4 Claims, 2 Drawing Sheets

U.S. PATENT DOCUMENTS

| | | | |
|---|---|---|---|
| 5,892,899 A * | 4/1999 | Aucsmith et al. | 713/200 |
| 5,892,904 A | 4/1999 | Atkinson et al. | |
| 5,913,038 A | 6/1999 | Griffiths | |
| 6,009,176 A | 12/1999 | Gennaro et al. | |
| 6,122,742 A | 9/2000 | Young et al. | |
| 6,161,181 A | 12/2000 | Haynes et al. | |
| 6,226,750 B1 | 5/2001 | Trieger | |
| 6,401,208 B2 | 6/2002 | Davis et al. | |
| 6,463,538 B1 * | 10/2002 | Elteto | 713/190 |
| 6,643,775 B1 * | 11/2003 | Granger et al. | 713/190 |
| 6,654,883 B1 | 11/2003 | Tatebayashi | |
| 6,668,325 B1 * | 12/2003 | Collberg et al. | 713/194 |
| 6,779,114 B1 * | 8/2004 | Chow et al. | 713/189 |
| 6,785,815 B1 | 8/2004 | Serret-Avila et al. | |
| 6,792,536 B1 | 9/2004 | Teppler | |
| 6,842,862 B2 * | 1/2005 | Chow et al. | 713/190 |
| 6,952,697 B1 | 10/2005 | Rothschild | |
| 6,959,384 B1 | 10/2005 | Serret-Avila | |
| 2002/0029337 A1 | 3/2002 | Sudia et al. | |
| 2002/0112161 A1 | 8/2002 | Thomas et al. | |
| 2002/0157003 A1 | 10/2002 | Beletski | |
| 2002/0178360 A1 | 11/2002 | Wenocur et al. | |
| 2003/0140178 A1 | 7/2003 | Evans | |

OTHER PUBLICATIONS

Forrest, Somayaji, Ackley "Building Diverse Computer Systems" 1997, IEEE Computer Society Press, pp. 1-6.*
U.S. Appl. No. 10/237,454, filed Sep. 6, 2002, Langer.
U.S. Appl. No. 10/237,393, filed Sep. 6, 2002, Langer.
U.S. Appl. No. 10/238,053, filed Sep. 6, 2002, Langer.
Tran, Tongoc; Office Action dated Mar. 28, 2006; U.S. Appl. No. 10/238,053, filed Sep. 6, 2002.
Loving, Jaric E.; Office Action dated Feb. 23, 2006; U.S. Appl. No. 10/237,393, filed Sep. 6, 2002.
Tolentino, Roderick; Office Action dated Feb. 2, 2006; U.S. Appl. No. 10/237,454, filed Sep. 6, 2002.

* cited by examiner

DETERRING REVERSE-ENGINEERING OF SOFTWARE SYSTEMS BY RANDOMIZING THE SITING OF STACK-BASED DATA

This application claims priority to provisional application No. 60/317,753 filed Sep. 6, 2001.

BACKGROUND OF THE INVENTION

1. Technical Field

The current invention is generally applicable to software designs of all types, but is especially useful in software to be run on general-purpose computers, such as Personal Computers (PCs). It is relevant to designs for which reverse-engineering of executing images of the software pose a risk, either of the software itself or the data being processed by the software.

The science of reverse-engineering to allow unauthorized knowledge or data access of a given software element or data being processed by the element is colloquially termed "hacking," those involved in the science are referred to has "hackers." Over the years, especially since the introduction of low-cost personal computers, both the sophistication of software and the value of the data being processed by that software have grown tremendously. Accordingly, the expended effort and sophistication of hackers has grown correspondingly. Modern day hackers have a vast arsenal of software tools and technical expertise to draw upon. The effort to protect both software itself and the data processed by that software has become increasingly more difficult and elaborate.

So advanced has the skill at protecting software from hacking become that "static" disassembly of disk files is often insufficient to the needs of hackers; distributing tasks among threads can impede such disassemblies often to the point of making them not worthwhile unless no other option exists. Thus, hackers have now turned to analyzing the executing image of software in an effort to understand how to gain access where the software's designer does not want uncontrolled access. In modern systems, a primary goal of the hacker is discovering the location of "interesting" data. Frequently, this data is considered "valuable" (in that it is copyrighted, contains sensitive information, etc.), and one real goal of a hacking effort is to gain access to this data, rather than put significant concern on how the software in question actually works.

To accomplish this, the hacker monitors various addresses in the computer's memory which are being accessed heavily. These "hot spots" could very likely be the location of the data the hacker wants to "pirate." Programs typically put data variables and buffers in the same addresses each time the program is run, so if a hacker discovers these addresses, he is a long way towards having a reliable vehicle for data piracy. Since the use of variables and buffers is unavoidable in practical software designs, the only viable way to block this form of hacking is to remove the consistency of their memory addresses, meaning that even if the hacker does determine the address of "interesting" data on one run of the software, those addresses won't be valid on subsequent runs. The hacker would be forced to determine the addresses of the "interesting" data each time the program is run, which is vastly more difficult. If combined with techniques to deter the program from being run under a debugger, a major weapon in the hacker's arsenal has been disabled.

2. Description of the Prior Art

Efforts to prevent hacking of both software and the data they are processing are probably as old as computers themselves. Each year the "ante gets upped", as both the designers of software and their competitors in the hacker communities become ever more sophisticated and knowledgeable. Every year sees the introduction of yet more powerful software tools that can be wielded with substantial effect by hackers.

The inventor of the current invention has been involved in the field nearly as long as the personal computer has been available, and is familiar with many of the "standard" techniques for deterring successful hacking. These include randomizing the size of allocated memory blocks, encrypting and incrementally decrypting components of a software entity, implementing a software component as an interpreter and making the mapping from the interpreted code to the actual implementation as disjoint as possible, use of "excessive multithreading" to divorce cause and effect, and so forth. The inventor has not, up until now, seen a technique or proposal to deter hacking by randomizing the siting of stack-based data in a given thread, which is the subject of embodiments of the current invention.

SUMMARY OF THE INVENTION

A given software process is composed on one or more threads of execution. Each thread possesses its own stack, a region of memory set aside by the operating system for that thread to store data. Popular programming languages rely heavily on stack-based data (frequently referred to as "local" or "automatic" data).

It is a characteristic of deterministic machines like computers that, given the same problem to process with the same data, the same results, both intermediate and final, will result. This even extends to the sequence the software running on the computer will take to process the problem or data. This in turn means that for each thread making up the program, the data layout in the thread's stack will be relatively consistent each time the program gets to a similar point in the processing of the problem and/or data. This represents a potential "point of repeatability" that a hacker can take advantage of.

Embodiments of the current invention address this by introducing random amounts of "padding" into a thread's stack, such that all data objects that exist "below" that point in the stack are offset by the amount of this random padding. A thread could have several points in its stack where the padding is introduced, resulting in better (more difficult to hack) randomization.

Additional aspects, features and advantages of the present invention are included in the following description of exemplary embodiments, which description should be read in conjunction with the accompanying drawings.

DESCRIPTION OF EXEMPLARY EMBODIMENTS OF THE INVENTION

The drawings depict a typical scenario before and after in the inclusion of embodiments of this invention. In this particular demonstration, a Microsoft C++ program is being used, where stack randomization is introduced via the alloca( ) function. The actual details of the stack's contents after inclusion of the illustrated embodiment of the current invention may differ in small details for other specific implementations.

Figure 1:
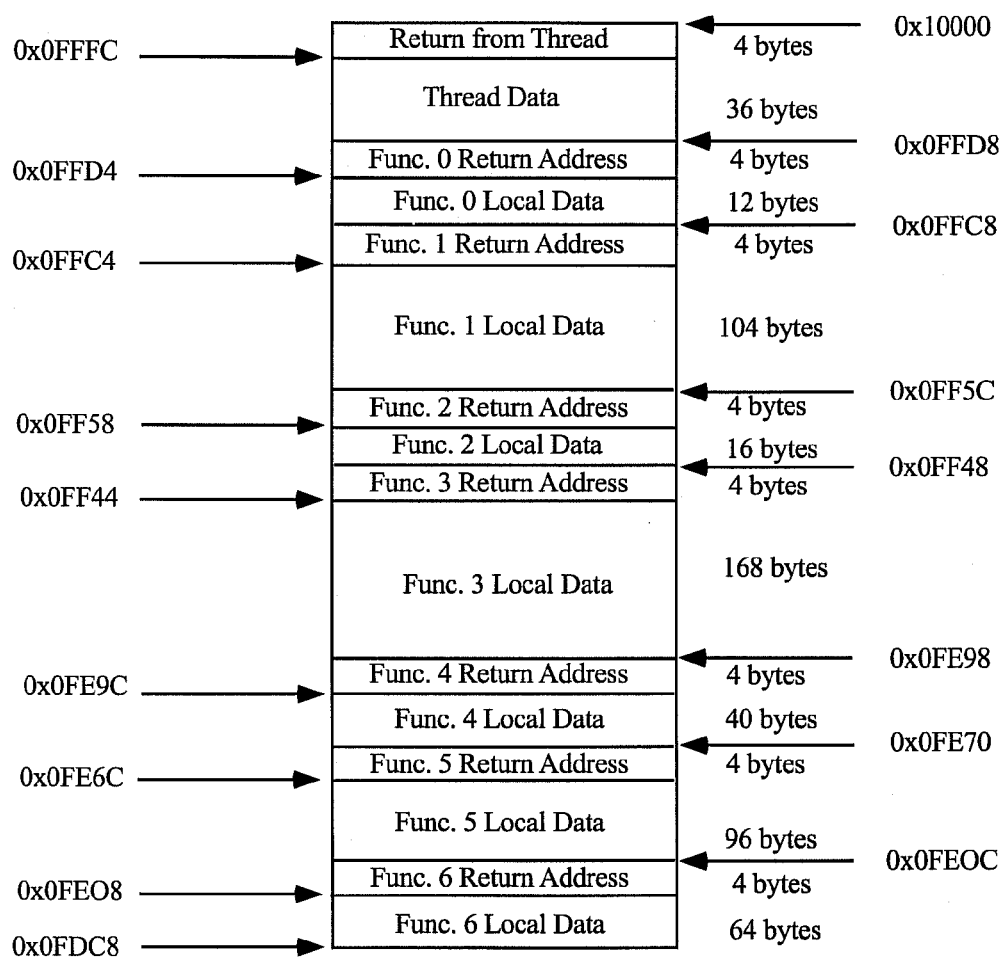
FIG. 1 shows an example of a standard call stack.

FIG. 1 shows a typical call stack with a number of functions "pending" on it, each having some amount of local data as well (it is not required that every function have local data; it just happens that they all do in this example). If we assume that the entire stack is depicted, function 6 is currently executing with six functions "waiting" on it in an orderly fashion.

Figure 2:
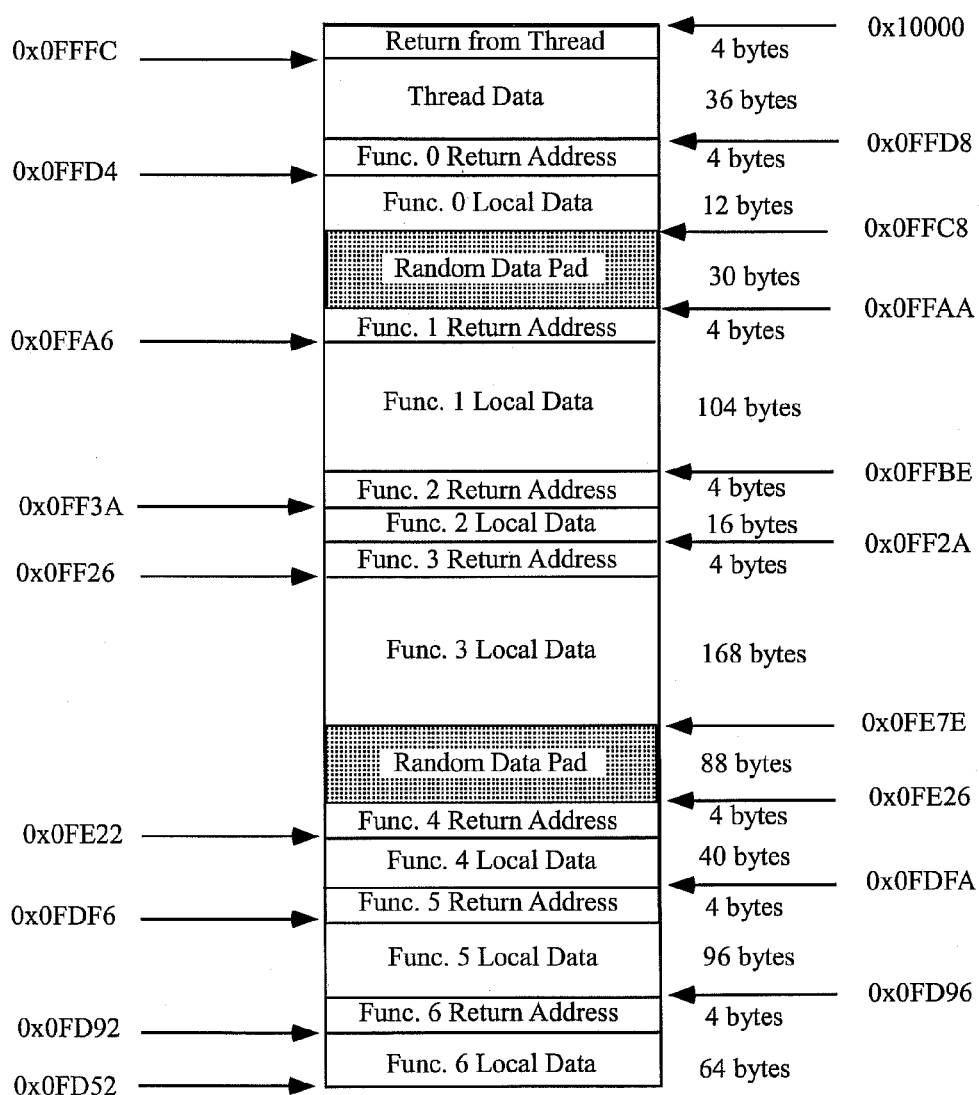
FIG. 2 shows the call stack with random padding added.

FIG. 2 shows the same call stack, but with two functions incorporating embodiments of the current invention. In this case, functions 0 and 3 have introduced additional stack allocations, thereby forcing everything "beneath" them to have their addresses moved by this additional offset. This Figure shows that more than one function in a given call stack "snapshot" could have implemented this invention; it is not limited to only one "instance" at any given moment.

Since the number of bytes in each "Random Data Pad" region is randomly chosen at runtime, all the addresses "below" it are likewise sited at random locations, in that they are biased by some offset introduced by the padding. Thus, even if the specific addresses of various stack-based data are determined for one run of the program, those addresses will not likely be valid on subsequent runs, so a prime hacking technique is thwarted.

To understand the intent of certain embodiments of the invention, it is necessary to understand what a stack is and how it works. A stack is a region of memory which is "allocated out" based on demand (it is special in that this demand is generated both by the software being run and the processor that is running the software). Each "allocation" from a stack is used for some length of time and then "deallocated". What is significant here is that the allocations build up in the region of memory comprising the stack in a specific manner. This manner has to do with the synchronization between allocation and deallocation: memory must, under all conditions, be deallocated in the exact reverse order it was allocated. This is in contrast to a so-called "heap", where such rigid sequencing is not required. A heap would seem to be much more flexible because of this lack of required sequencing, but stacks are important because they are both very fast, and because the underlying architecture of the CPU requires them.

A stack, as it is used in the context of certain embodiments of this invention, contains some amount of subroutine return addresses and "local data," interleaved. So pre-defined is this structuring that the concept of "stack frames" has come into common use; a stack frame is a subroutine return address followed by some (possibly zero) bytes of "local data." When a subroutine is "called," the CPU pushes the return address of the subroutine onto the stack before the code of the subroutine begins executing. Typically, the subroutine adjusts the stack pointer further to make room for local data, so the stack pointer is now pointing to the "bottom" of the local data rather than at the subroutine's return address. If this subroutine calls another subroutine, both the return address and local data for the calling subroutine are preserved; the called subroutine has its return address pushed onto the stack just below the local data of the calling subroutine, and any local data for the called subroutine is allocated below that return address (the directional notion of something being "above" or "below" another in a stack is conventional parlance; stacks are typically viewed as "growing downward"). When any subroutine returns, the stack pointer is adjusted "upwards" to move "past" both the return address and local data for the subroutine being returned from; this makes that region of the stack available for another use.

As can be seen from the foregoing, at any point in time the stack contains the call history to that point in execution and all the local data for all the subroutines "waiting" on the stack. This history traces all the way back to the start of the thread; typically, the very "top" of a stack is a return address to be followed when the thread "expires."

Now, owing to the deterministic nature of computers and the software they execute, each thread will generally follow the same course of processing each time it is run, so that the stack layouts tend to be similar from run to run. This tends to be especially true for return addresses and local data near the "top" of the stack (those functions called early on in the thread's execution profile), and this is typically where the local data containing the "interesting" content is allocated; these local allocations are then passed down to called subroutines for their common use. The upshot of all this is that the thread-relative address of much "interesting" local data tends to be repeatable or easily deduced, making it vulnerable to hackers.

Embodiments of the current invention address this by "chewing up" additional stack resources in a random manner. Some effective ways in which this can be done include:

1) If the compilation facility supports it (as Microsoft C++ does), some subroutines can allocate random amounts of local data, meaning that all subroutines called from this subroutine will have their return addresses and local data "re-sited" by an offset corresponding to the amount of "additional" local data the earlier subroutine obtained. As a concrete example, a C++ function compiled under Microsoft C++ could call the alloca( ) function, passing in a random number as the argument to that function.

2) A function could be called by an intermediate "helper" function, one that calls itself recursively a random number of times (introducing a random number of "dummy" stack frames in the process). Although at first glance more complicated than the first technique, it does have the advantage that it doesn't require any runtime support not defined by the language standard(s).

Either (or both) methods are effective at randomizing the siting of local data on a thread's stack.

Although the invention has been described with respect to various exemplary embodiments, it will be understood that the invention is entitled to protection within the full scope of the appended claims.

What is claimed is:

1. A method of managing memory for a thread of execution of a protected application in a computer system having at least one stack, the method comprising:

allocating a first amount of stack space for use by a first set of data adapted for use by the thread;

allocating a second amount of stack space, wherein the size of the second amount of stack space is randomly determined at runtime of the thread, wherein the second amount of stack space is not adapted for use by the thread, and wherein the allocation of the second amount of stack space occurs at runtime of the thread; and allocating a third amount of stack space for use by a second set of data adapted for use by the thread, wherein the step of allocating the second amount of stack space occurs prior to one of the step of allocating the first amount of stack space and the step of allocating the third amount of stack space, wherein the size of the second amount of stack space is randomly determined by using a recursive function that calls itself a random number of times.

2. The method of claim 1 wherein the recursive function introduces a frame each time that the recursive function calls itself thereby storing a plurality of frames in the stack, and wherein the plurality of frames is not adapted for use by the thread.

3. A computer system comprising:
a memory adapted to store a stack;
a processor coupled to the memory and adapted to execute a software routine of a protected application; and
programming logic adapted to be executed by the processor, said programming logic comprising:
means for allocating a first amount of stack space for use by a first set of data adapted for use by the software routine;
means for allocating a second amount of stack space, wherein the size of the second amount of stack space is randomly determined at runtime of the software routine, wherein the second amount of stack space is not adapted for use by the software routine, and wherein the allocation of the second amount of stack space occurs at runtime of the thread; and
means for allocating a third amount of stack space for use by a second set of data adapted for use by the software routine wherein the means for allocating the second amount of stack space allocates the second amount of stack space prior to a point in time when one of the first amount of stack space is allocated and the third amount of stack space is allocated,
wherein the size of the second amount of stack space is randomly determined by using a recursive function that calls itself a random number of times.

4. The system of claim 3 wherein the recursive function introduces a frame each time that the recursive function calls itself thereby storing a plurality of frames in the stack, and wherein the plurality of frames is not adapted for use by the software routine.

* * * * *